United States Patent
Kaspit et al.

(10) Patent No.: US 7,199,921 B2
(45) Date of Patent: Apr. 3, 2007

(54) TWO STAGE OPTICAL AMPLIFIER

(75) Inventors: Idan Kaspit, Rosh Ha'ayin (IL); Tal Muzicant, Givataim (IL)

(73) Assignee: ECI Telecom Ltd., Petach Tikva (IL)

( * ) Notice: Subject to any disclaimer, the term of this patent is extended or adjusted under 35 U.S.C. 154(b) by 117 days.

(21) Appl. No.: 10/864,600

(22) Filed: Jun. 10, 2004

(65) Prior Publication Data

US 2004/0223210 A1    Nov. 11, 2004

Related U.S. Application Data

(63) Continuation-in-part of application No. 10/681,249, filed on Oct. 9, 2003.

(30) Foreign Application Priority Data

Oct. 9, 2002  (IL) .................................... 152193

(51) Int. Cl.
   *H01S 4/00* (2006.01)
   *H04B 10/12* (2006.01)
(52) U.S. Cl. .................... 359/337.4; 359/333
(58) Field of Classification Search ............ 359/337.4, 359/337.2, 333
   See application file for complete search history.

(56) References Cited

U.S. PATENT DOCUMENTS

| | | | |
|---|---|---|---|
| 5,557,265 A * | 9/1996 | Moothart et al. ............ 340/635 |
| 5,778,132 A * | 7/1998 | Csipkes et al. ............. 385/135 |
| 5,978,131 A | 11/1999 | Lauzon et al. | |
| 6,215,584 B1 | 4/2001 | Yang et al. | |
| 6,236,499 B1 * | 5/2001 | Berg et al. ............... 359/341.2 |
| 6,275,331 B1 * | 8/2001 | Jones et al. ............ 359/341.44 |
| 6,288,810 B1 * | 9/2001 | Grasso et al. ................... 398/9 |
| 6,344,915 B1 * | 2/2002 | Alexander et al. .......... 398/115 |
| 6,411,407 B1 * | 6/2002 | Maxham ..................... 398/173 |
| 6,411,430 B1 | 6/2002 | Ogino et al. | |
| 6,437,888 B1 | 8/2002 | Grasso et al. | |
| 6,580,551 B2 * | 6/2003 | Terahara .................. 359/337.1 |
| 6,611,371 B2 * | 8/2003 | Wigley et al. ........... 359/337.2 |
| 6,621,621 B1 * | 9/2003 | Jones et al. ............ 359/337.11 |
| 6,690,503 B2 * | 2/2004 | Yamanaka ................... 359/334 |
| 2003/0117696 A1 | 6/2003 | Goobar et al. | |
| 2004/0052526 A1 * | 3/2004 | Jones et al. .................... 398/50 |
| 2004/0100684 A1 * | 5/2004 | Jones et al. ............ 359/337.11 |

* cited by examiner

*Primary Examiner*—Deandra M. Hughes
*Assistant Examiner*—Eric Bolda
(74) *Attorney, Agent, or Firm*—The Nath Law Group; Harold L. Novick; Stanley N. Protigal

(57) ABSTRACT

The invention describes a system of two-stage optical amplifiers adapted for inserting OADM in the mid-stage, and an integrated assembly designed for implementing the amplifiers in a way suitable for forming bi-directional configurations useful in optical networks. A so-called east-west configuration for a bi-directional transmission is described, where each direction of the optical transmission is served by the two-stage optical amplifier the $1^{st}$ stage of which belongs to one integrated assembly, and the $2^{nd}$ stage—to another assembly.

10 Claims, 7 Drawing Sheets

TWO STAGE OPTICAL AMPLIFIER

CROSS-REFERENCE TO RELATED APPLICATION

This application is a continuation-in-part of U.S. patent application No. 10/681,249 filed Oct. 9, 2003.

FIELD OF THE INVENTION

The present invention concerns a configuration of a so-called two stage optical amplifier which is a widely known element in optical telecommunication networks.

BACKGROUND OF THE INVENTION

Traditionally, a two-stage optical amplifier serves as a piece of equipment of an optical line.

Usually, the two stages of amplification are two different amplifying units connected in sequence in a pre-manufactured assembly, where the first unit is considered the first stage of the assembly and called an optical pre-amplifier, while the second unit (an optical booster) which follows the first one is considered the second stage. Such a configuration is usually implemented as a unidirectional integral assembly and, in the frame of the present description, will be called a conventional two-stage unidirectional configuration.

Each of the amplifying units usually comprises a single stage optical amplifier such as EDFA (Erbium Doped Fiber Amplifier) characterized by particular optical features (gain, flatness, noise, output power, etc).

The conventional two-stage unidirectional configuration is advantageous in that it has a higher maximum output power than a single stage optical amplifier and allows using relatively inexpensive amplifying units which might have differing optical parameters. However, when connecting such amplifiers into the two-stage configuration, degradation may appear in the flatness of the gain over the band of optical wavelengths supported by the combined amplifier. That's why the two amplifiers for the two-stage configuration are usually selected to have gain characteristics which allow compensating one another. The gain flatness can be adjusted by an operator during the manufacturing process, when interconnecting between the two stages. In practice, when manufacturing the assembly, the optical parameters of the first stage and the second stage of the unidirectional configuration are matched to produce the best performance, using a control interconnection between the two stages, that control interconnection comprising a communication channel and a micro controller, both provided within the assembly and serving the two mentioned stages of the unidirectional assembly. During operation of the assembly, the control interconnection continues fulfilling its functions for matching parameters of the amplifiers and coordinates their operation.

The unidirectional configuration may include a network element connected between the two stages (in the mid-stage). Such, intermediate elements have been used for signal attenuation, dispersion compensation, etc.

One example of such a configuration is described in U.S. Pat. No. 6,215,584.

It should be mentioned, that the conventional two-stage or multi stage unidirectional assembly, even when allowing independent control of parameters of the stages by the control circuit, is arranged in such a way that if a fiber cut occurs before the first stage amplifier, it behaves as a single integral device i.e., all stages of the assembly are shut down by the assembly controller, since the whole assembly appears to be useless in the absence of the input optical signal. Such a feature contradicts to inserting OADM (Optical Add Drop Multiplexer) in the mid-stage of the above-described configuration. One should recall that OADM is intended for receiving a WDM (wavelength division multiplexed) multi-channel optical signal, dropping at least part of optical information channels, and/or adding information to at least one of vacant optical channels for further transmitting a newly composed multi-channel multiplexed optical signal. Therefore, OADM in the mid-stage seems to be useless, since the complete shutdown of the two-stage configuration in the case of a fiber cut is harmful not only to the information received at the $1^{st}$ stage, but also to the information added by the OADM.

The unidirectional two-stage configuration could theoretically be built from two separate amplifiers, which do not form an integrated assembly and thus each of the stages works independently when the other stage fails for any reason. Such a configuration would easily allow inserting OADM or any other element in the mid stage. However, in that case, high quality amplifiers with flat optical characteristics would be required and the configuration would become too expensive.

OBJECT OF THE INVENTION

It is the object of the present invention to provide a two-stage optical amplifier configuration which would be suitable for inserting, between the two stages thereof, any network element (including optical add drop multiplexer OADM) and being free from disadvantages of the known two-stage configurations of optical amplifiers.

SUMMARY OF THE INVENTION

According to the first aspect of the invention, the Inventors propose a two-stage configuration of an optical amplifier (comprising $1^{st}$ stage, a $2^{nd}$ stage and a mid-stage) wherein each stage of the configuration is formed by at least one optical amplifying unit, and wherein the configuration (i.e., the optical amplifier):

being adapted for inserting in the mid-stage thereof any network element (possibly comprising OADM), allowing matching at least one optical characteristics of the two stages, and being capable of leaving one of the stages to function in a regular regime whenever the other of the stages is shut down.

It should be noted that each stage of the two-stage amplifier may be composed of one or more amplifying units. In the simplest case, each stage comprises one optical amplifier.

The above-defined amplifier configuration, while allowing independent functioning of the two stages, can be built from inexpensive amplifying units matched from the point of optical characteristics.

To obtain the one matched optical characteristics, it is proposed that the two stages of the two-stage amplifying configuration be interconnected with one another by a control-communication channel for, at least, gain control of the amplifying units. Preferably, the channel provides also for control of other optical parameters of the amplifying units (and thus of the resulting optical amplifier), such as gain flatness and gain tilt.

Selection of the parameters to be matched and the preliminary matching of the first stage and the second stage of the amplifier are to be performed by the manufacturer. Further, the control-communication channel serves for adjusting the parameters during operation of the assembly.

According to one embodiment of the amplifier configuration, it can be implemented on the conventional unidirectional two-stage amplifying assembly, by proving to it the abiliy to prevent shutting down the one of the stages when one of the stages is to be shut down (say, when a fiber cut is detected).A system comprising a pair of such assemblies may serve two opposite directions of optical transmission, where each assembly is used for a particular direction.

The term "assembly" should be understood as a prefabricated module, most likely an integrated printed circuit card.

To enable operability of the other stage when one of the stages in the integral unidirectional two-stage amplifying assembly is to be shut down, changes should be introduced in the control-communication channel of the assembly (for example, in its micro-controller). The control-communication channel (or control interconnection), which exists in the conventional integral two-stage unidirectional assembly and comprises a communication channel and a micro controller, will enable matching the parameters of the two stages also in the presence of such element as OADM in the mid-stage.

According to one preferred embodiment of the invention, the two-stage configuration (amplifier) comprises its 1.sup.st stage and its 2.sup.nd stage located at two seperate assemblies (modules or cards), wherein the optical connection and the control-communication channel between the stages is arranged externally between the cards.

In accordance with the most preferred embodiment of the invention, there is provided a conbined configuration (which will further be referred to as East-west bi-directional configuration or system) comprising a pair of two-stage amplifiers as defined above, for respectively serving two opposite directions of optical transmission; in the combined system each of the seperate assemblies (modules) accommodates the 1.sup.st stage of the two-stage amplifier and the 2.sup.st stage of the other two-stage amplifier.

Any of the above-mentioned configurations (i.e., any of the defined amplifiers or systems) can be implemented using the following newly proposed universal assembly that forms a second aspect of the present invention:

A universal two-stage optical amplifier assembly (universal assembly) comprising a 1.sup.st stage and a 2.sup.nd stage, each formed by at least one optical amplifying unit, the 1.sup.st and 2.sup.nd stages being preliminarily matched from the point of at least one optical characteristics to be suitable to form a two stage optical amplifier, input of the assembly being connected to input of the $1^{st}$ stage, output of the $2^{nd}$ stage being connected to output of the assembly, output of the 1.sup.st stage and input of the 2.sup.nd stage are respectively connected to a pair of mid-stage contacts of the assembly (thereby allowing introducing an optical element either between the 1.sup.st stage and the 2.sup.nd stage of the universal assembly, or between any of the stages of the universal assembly and a complementary stage of another similar universal assembly, the assembly also comprises a control-communication circuit capable of matching at least one optical characteristics of the assembly and of preventing shut down of one stage when the other is shut down, wherein the circuit is selectively configurable either to form a control-communication channel between the 1.sup.st stage and the 2.sup.nd stage of the assembly, or to disconnect the channel there-between while enabling each of the 1.sup.st stage and the 2.sup.nd stage to form a separate control-communication channel with a complementary stage located on another similar universal assembly.

The universal assembly is formed on one module, preferably being an integrated printed circuit card.

Preferably, the 1.sup.st stage and the 2.sup.nd stage are preliminarily matched in such a manner that the 1.sup.st stage of the universal assembly is preliminarily adjusted to match to a set of average characteristics designed for the 2.sup.nd stage, while the 2.sup.nd stage of the universal assembly is preliminarily adjusted to match to a set of average characteristics designed for the 1.sup.st stage, so that any of the 1.sup.st stage and the 2.sup.nd stage of the universal assembly approximately matches to a complementary stage of the universal assembly or of another similar universal assembly.

Also preferably, the control-communication circuit is capable of flirther dynamically matching any of the 1.sup.st stage and the 2.sup.nd stage of the universal assembly to a complementary stage of the universal assembly or of another similar universal assembly.

In the preferred embodiment, the control-communication circuit comprises a switch or just a pair of contacts, dividing the circuit into two separate portions respectively suitable for being connected to corresponding separate portions of a control-communication circuit of another similar universal assembly, so to form a control-communication channel between a $1^{st}$ stage of one assembly and a $2^{nd}$ stage of the other assembly and wise versa.

The above-defined universal two stage assembly (universal assembly) can be used for forming:

a) a unidirectional two-stage configuration (a two-stage optical amplifier) based on one universal integrated assembly, when the mid-stage contacts serve for connecting the stages of the same assembly and the control-communication channel is also formed there-between (shown as assembly 20 or 120 in FIG. 3*a*);

b) a bi-directional configuration or system for serving two directions of optical transmission (shown in FIG. 3*b*) where each of the two directions of optical transmission is served by (a), i.e. by the unidirectional two-stage amplifier configuration built using one universal integrated assembly;

c) a unidirectional two-stage configuration (a two-stage optical amplifier) based on two universal assemblies, where $1^{st}$ stage of one assembly is directly or indirectly connected to $2^{nd}$ stage of the other assembly, and the control-communication channel is formed between these same stages of the different assemblies (shown as a contour 51 in FIG. 3*c* or as a contour 60 in FIGS. 7, 8);

d) a bi-directional combined configuration or system (FIGS. 3*c*, 7, 8) based on two universal assemblies, where each direction of optical transmission is served by the amplifier configuration (c). This bi-directional system is a so-called East-West configuration.

Owing to the fact that the stages of the two-stage amplifiers are located at different modules (assemblies, cards), and due to the fact that the control-communication channel is arranged between the two modules to enable matching of the optical parameter(s) of the stages belonging to different modules, the configurations (c) and (d) ensure:

easy replacement of any of the stages if needed, without a harm to the second stage and, upon replacing the module with another universal assembly, operation without degradation of the two-stage configuration performance since the matching will be performed by the newly formed control-communication channel.

All the above-proposed two-stage optical amplifying configurations (amplifiers and systems) are suitable for inserting OADM in the mid-stage.

To understand inventiveness of the proposed two-stage optical amplifying configurations and the universal assembly over the prior art, one should recall that:

firstly, a conventional two-stage unidirectional configuration has a set of improved optical characteristics but, when a fiber cut is detected before its first stage amplifier, behaves as an integral device shutting down both its stages;

secondly, OADM, if inserted in the mid-stage of the conventional configuration, would be disabled since the complete shutdown of the two-stage configuration in a case of a fiber cut is harmful to the information added by the OADM; it should be noted that the information introduced by the OADM comes from source(s) non-affected by the fiber cut, and could be independently transmitted to the network if not the complete shut down of the assembly;

thirdly, a two-stage amplifier, if assembled from optical amplifiers being not of the highest quality, needs prior matching there-between and never enables replacement of any of the amplifiers (be it possible) without degradation of the configuration performance, since re-matching the new pair of amplifiers is very problematic.

The proposed configurations and the universal assembly allow overcoming the above-mentioned disadvantages.

According to a slightly different aspect of the invention, there is also provided a system (preferably, placed in a network node) comprising at least one two-stage optical amplifier configuration, with OADM in the mid-stage.

In particular, it can be a system (a network node) comprising a pair of two stage amplifiers located at two separate modules, for respectively serving two opposite directions of bi-directional optical transmission. Each of the two-stage optical amplifiers comprises a 1.sup.st stage, a 2.sup.nd stage and a mid-stage formed between the two stages, and serves one of the two opposite transmission directions, each stage of the two stages is formed by at least one optical amplifying unit and is located at a separate module, so that each of the two separate modules accommodates the $1^{st}$ stage of one of the amplifiers and the $2^{nd}$ stage of the other of the amplifiers. The system comprises at least two Optical Add Drop Multiplexers (OADMs) connected in the mid-stages of the two-stage optical amplifiers.

The OADMs can be connected in such a manner that each of the two transmission directions is completely (separately) served by at least one of the OADMs. If two OADMs serve the two transmission directions, they look to be connected "in parallel". In the preferred embodiment, the OADMs in the system are connected in such a manner that at least one of the OADMs (and preferably each of them) serves both of the two transmission directions or both of the two transmission fibers via which the data is transmitted in the opposite directions. In this embodiment, if two such OADMs are arranged as described, they appear to be connected "in series".

Further, each two-stage amplifier of the above system preferably allows matching at least one optical characteristics of the two stages, and is capable of leaving one of the stages to function in a regular regime whenever the other of the stages is shut down, as has been described above with respect to the proposed two stage amplifiers. Further preferably, the two stages are matched from the point of optical characteristics and interconnected with one another by a control-communication channel for controlling at least one parameter of the amplifying units (for example, gain, gain flatness and gain tilt). The optical connection and the control-communication channel between the stages is arranged externally between the mentioned modules.

Still further, each of the modules can be designed as the above-mentioned universal two-stage optical amplifier assembly, comprising 1.sup.st stage and a 2.sup.nd stage being preliminarily matched from the point of at least one optical characteristics. The structure and features of such a universal assembly can be similar to those described above.

More details and explanations will be given as the description proceeds.

BRIEF DESCRIPTION OF THE DRAWINGS

The invention will be further described and illustrated with the aid of the following non-limiting drawings in which:

FIG. 5, using a pair of amplifier assemblies and a pair of OADMs.

DETAILED DESCRIPTION OF THE INVENTION

Figure 1A:
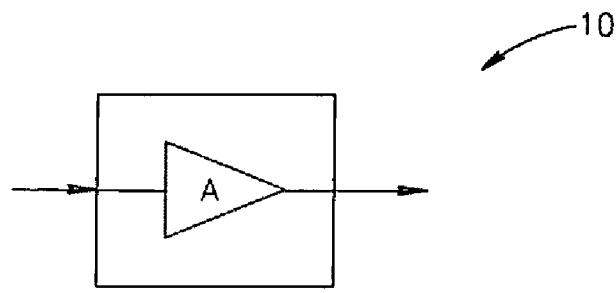
FIG. 1a shows a conventional one stage optical amplifier.

FIG. 1a (prior art) schematically illustrates a basic optical amplifier 10. Arrows at the input and the output of the amplifier show direction of the optical transmission. Any optical amplifier is characterized by a number of optical parameters, which include, for example, the following set: gain, flatness of the amplifier's gain (as a function of wavelength), noise figure, maximal output power of the amplifier. A stand-alone amplifier of a high quality usually has good optical characteristics (say, the uniform flatness over a sufficiently wide spectrum of wavelengths), and is relatively expensive.

An amplifying unit of a moderate quality is quite cheap but is not used alone since it has non-uniform optical characteristics.

Figure 1B:
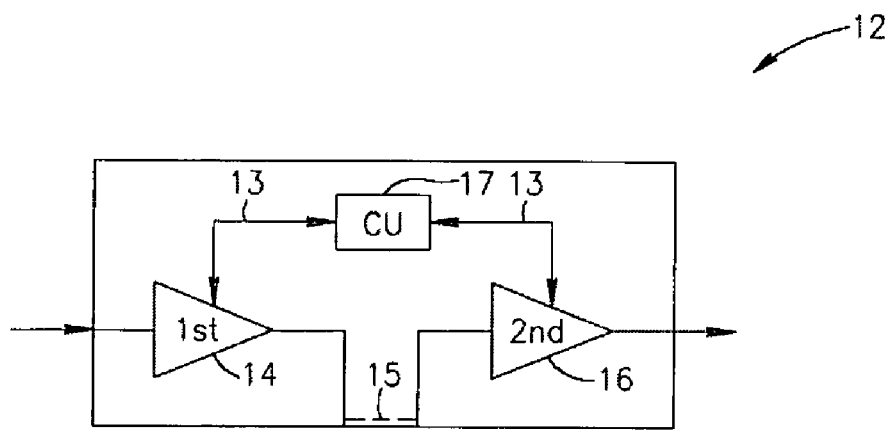
FIG. 1b shows a conventional two-stage unidirectional optical amplifier assembly.

FIG. 1b (prior art) schematically illustrates a conventional two-stage optical amplifier assembly 12 where the output of a $1^{st}$ stage amplifying unit 14 is connected to the input of a $2^{nd}$ stage optical amplifying unit 16 either directly (a dotted line 15) or via an optical element (not shown) which can be connected in the mid-stage.

Owing to the fact that the $1^{st}$ stage and the $2^{nd}$ stage amplifiers produce a summary gain and are preliminarily matched in the pre-fabricated assembly, the set of parameters which is provided by the assembly 12 is improved in comparison with that of a single amplifying unit.

The parameters are matched also dynamically, during operation of the assembly, by providing there-between a control-communication channel schematically shown as 13 with a micro controller 17 to ensure the power and gain control. The conventional configuration 12 shuts down completely in case any of the stages 14 or 16 fail or has to be shut down.

According to one embodiment of the present invention, the conventional configuration 12 can be modified into such preventing the complete shut down when one of the stages is shut down. For example, the micro controller 17 can be reprogrammed to prevent shutting down the $2^{nd}$ stage 16 in case of a fiber cut before the $1^{st}$ stage 14, while still shutting down the $1^{st}$ stage 14.

Figure 2:
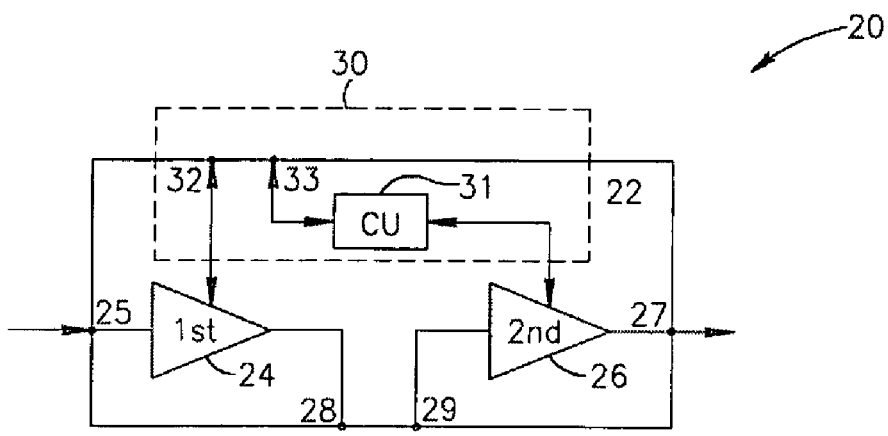
FIG. 2 schematically illustrates the proposed universal two stage optical amplifier assembly suitable for inserting a network element in the mid-stage.

FIG. 2 schematically illustrates the proposed universal two-stage amplifier assembly 20 which, in the simplest case, comprises two amplifier units placed on one card 22. An amplifying unit 24 of the $1^{st}$ stage is preliminarily adjusted to match to a pre-selected set of averaged optical characteristics which is designed for $2^{nd}$ stage amplifying units of any of such universal assemblies, while the unit 26 of the $2^{nd}$ stage is preliminarily adapted to match to a pre-selected set of averaged optical characteristics designed for $1^{st}$ stage amplifier units of the universal assembly. Therefore, the $1^{st}$ and the $2^{nd}$ stages of the assembly 20 are in advance matched to provide a set of optical characteristics which should be better that those of one of the stages. Input 25 of the assembly is connected to input of the $1^{st}$ stage, output of the $2^{nd}$ stage is connected to the output 27 of the assembly, and the mid-stage of the configuration is connected to so-called mid-stage contacts 28, 29 of the assembly. It is understood that these contacts may be connected to network element(s) to be placed in the mid-stage, if so desired, or short-circuited. The assembly 20 comprises a control-communication circuit schematically marked by a dotted contour 30. The circuit 30 comprises a micro-controller 31 (which, inter alia, is adapted to prevent shutting down both stages of a two-stage configuration if one of the stages fails) and forms a broken control-communication channel between the $1^{st}$ stage and the $2^{nd}$ stage, say by providing two external contacts 32 and 33. When short-circuited, the contacts form the closed control-communication channel between the amplifiers 24 and 26.

Optionally, the contacts 28, 29 and 32, 33 may be replaced by switches (not shown) for providing any desired connections.

Figure 3A:
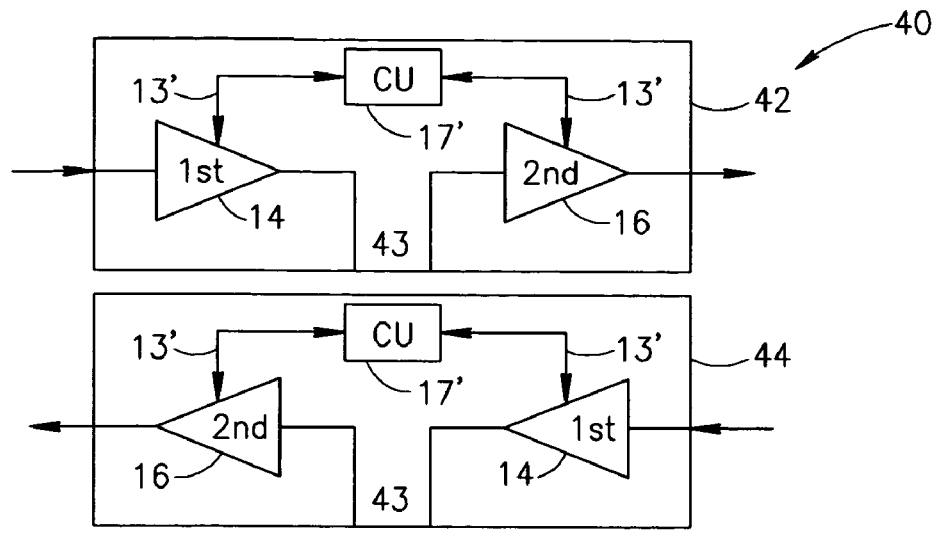
FIG. 3a is a schematic block-diagram illustrating a bi-directional two-stage amplifier configuration where each direction of the transmission is served by one two-stage amplifier assembly.

FIG. 3a illustrates one bi-directional configuration 40 using two unidirectional integrated assemblies 42 and 44 respectively serving two opposite directions of transmission in a telecommunication line. Each of the assemblies 42 and 44 is suitable for inserting any network element (and OADM as well) in the mid stage 43 thereof. Each of the assemblies 42 and 44 can be a unidirectional assembly similar to that shown in FIG. 1b but modified (channel 13' and CU 17') so as to prevent complete shutting down of the assembly when one of its stages is shut down.

Figure 3B:
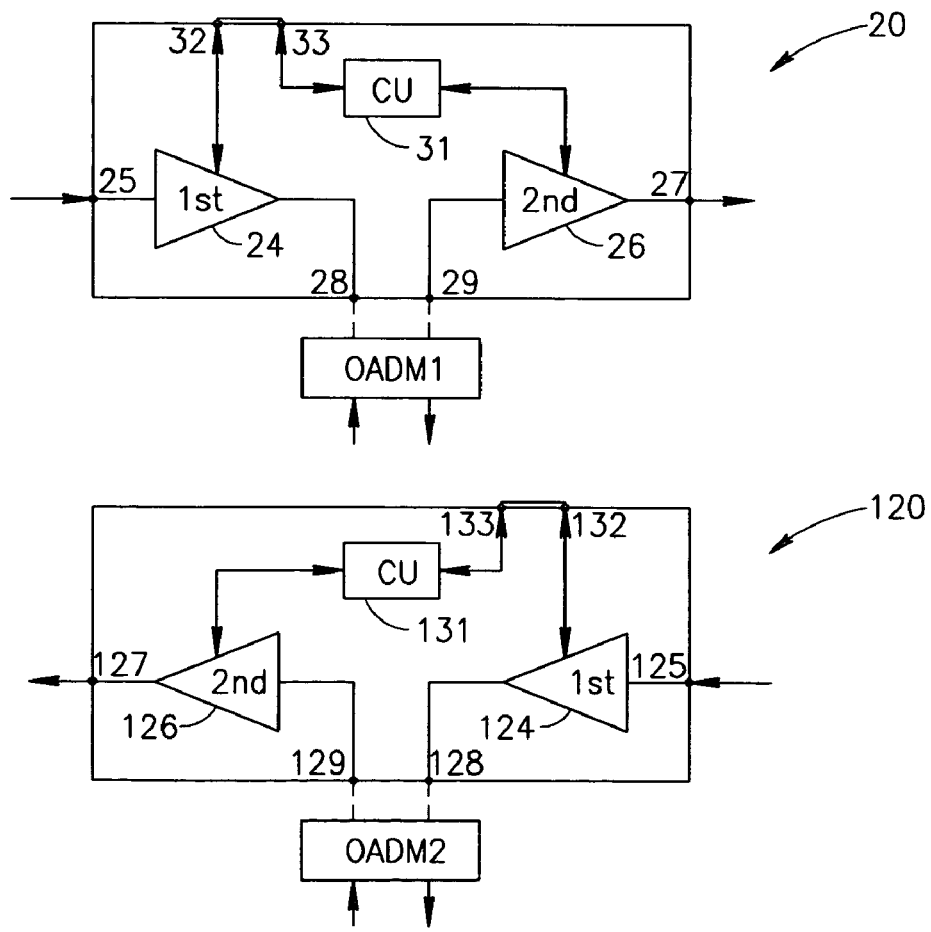
FIG. 3b illustrates how the configuration shown in FIG. 3a can be built using the universal assemblies as shown in FIG. 2.

FIG. 3b shows how the configuration 40 can be built from a pair of the identical universal assemblies 20 and 120, as illustrated in FIG. 2. For the sake of example, each of the assemblies serving a particular direction is shown with an OADM in the mid-stage. All reference numbers of the assembly 120 are formed by adding digit 1 before the analogous numerals of the assembly 20.

Figure 3C:
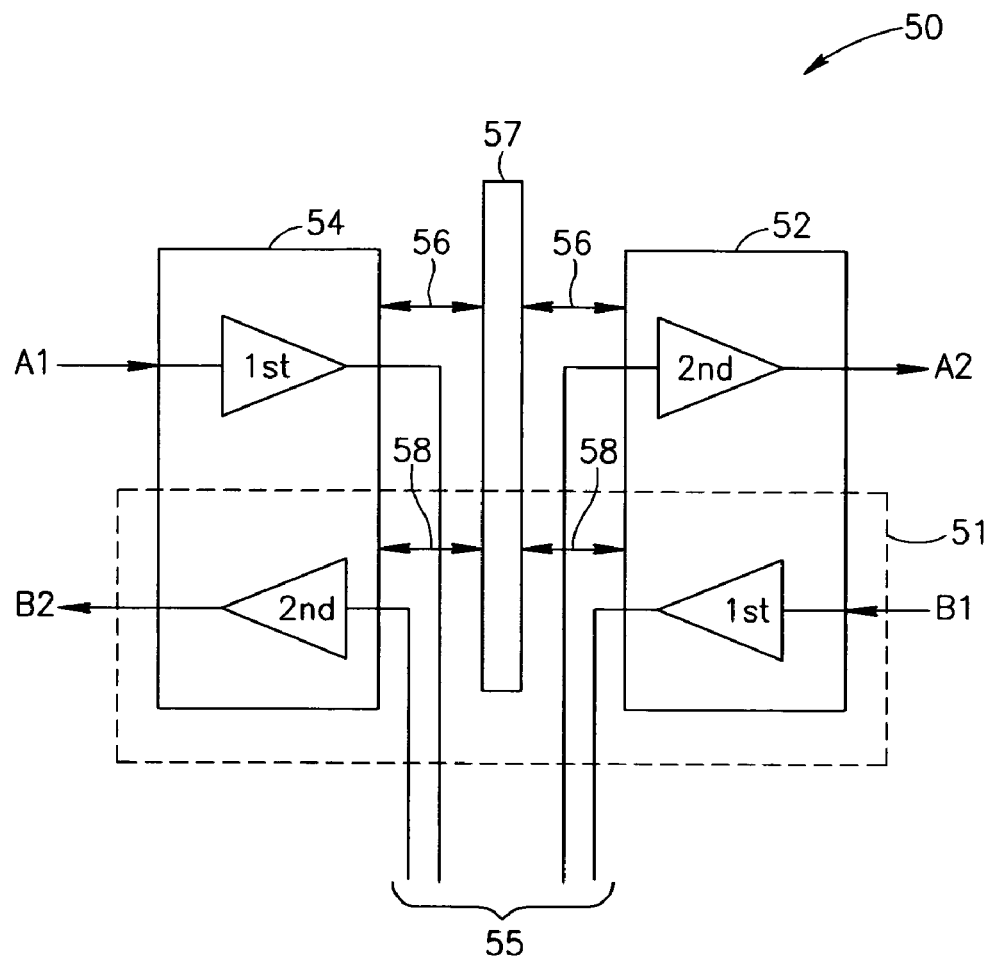
FIG. 3c illustrates a schematic block-diagram of a bi-directional two-stage amplifier configuration where each direction of transmission is served by two amplifier assemblies (East-West configuration).

FIG. 3c illustrates a schematic block-diagram of a bi-directional two-stage amplifiers' configuration 50 where each direction of transmission is served by a two-stage amplifier configuration (such as 51) formed by two different integrated amplifier assemblies (cards) 52 and 54. This bi-directional configuration 50 is the most preferred one, a so-called East-West configuration, which cannot be implemented using neither the conventional two-stage integrated assembly (FIG. 1b), nor its modified version.

A so-called mid-stage 55 of both of the unidirectional configurations utilizes the real gap between inputs and outputs of the two cards 52 and 54, and may serve for inserting optical elements between the stages of the unidirectional configurations. The control-communication channels schematically shown and marked 56 and 58 are also arranged between the cards. All or some external connections can be arranged, for example, using a back-plane 57 of a shelf structure holding the cards 52, 54, fixed couplings may be formed in the back plane for the purpose.

The most practical use of the mid-stage 55 is obtained by inserting one or more OADMs. Other optical elements can be inserted in the mid-stage if required (for example, dispersion compensating fibers/modules).

Figure 4:
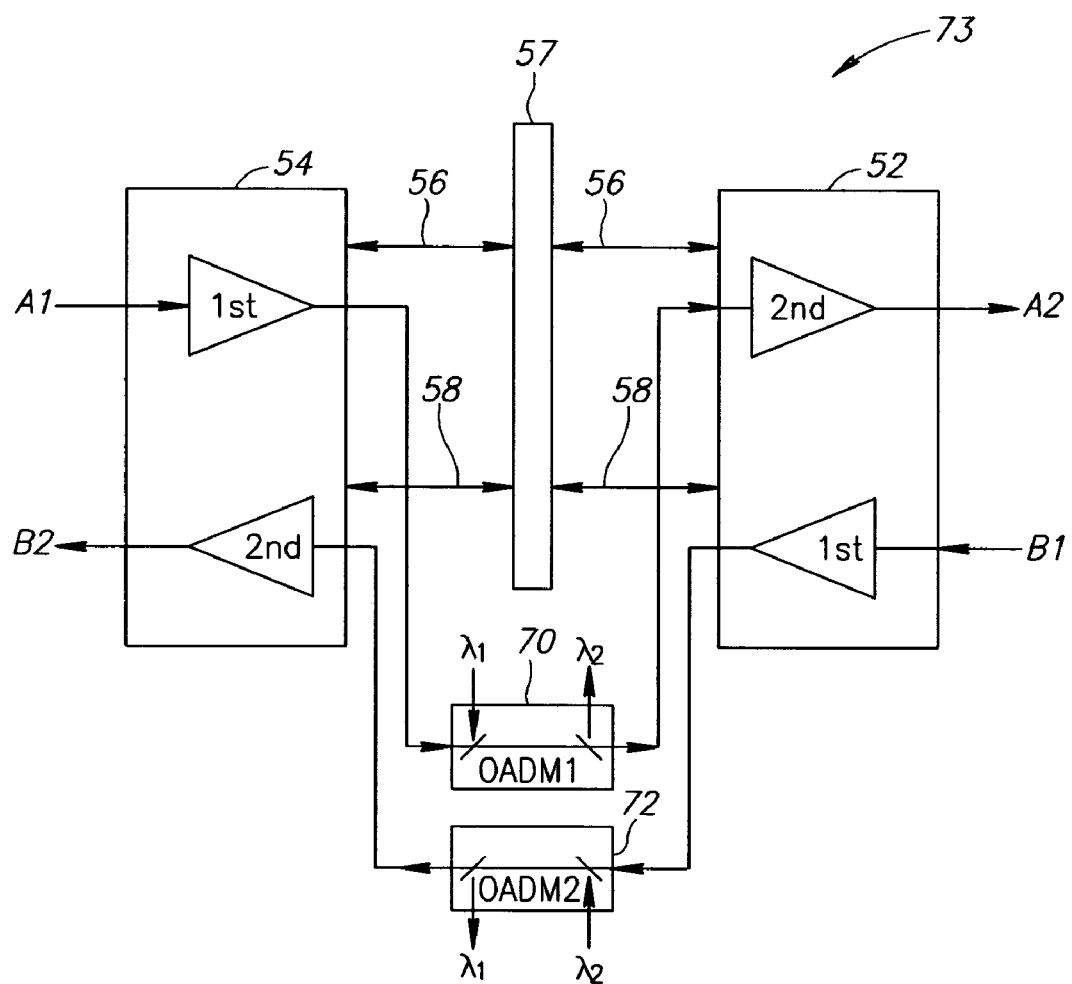
FIG. 4 shows one possible way of inserting two OADMs in the mid-stage of the amplifiers assemblies of the East-West configuration shown in FIG. 3c.

FIG. 4 shows one option of connecting OADMs in the mid-stage of the proposed two-stage amplifiers for the East-West configuration of FIG. 3c. OADM 1 (marked 70) is inserted between the $1^{st}$ stage amplifier of the assembly 54 and the $2^{nd}$ stage amplifier of the assembly 52 serving one and the same transmission direction (one and the same optical fiber line), thus the OADM 1 forms integral part of that transmission line marked A1–A2. OADM 2 (indicated as 72) is inserted in the mid-stage between the remaining pair of amplifiers and serves, together with these amplifiers, the opposite transmission direction fiber line B1–B2. OADM1 and OADM2 are separate and independent from one another. The whole system shown in FIG. 4, including the two OADMs 70 and 72 can be considered a network node 73 in a bi-directional network path, where some optical channels are dropped to deliver information to associated customers (not shown), and some optical channels are added to receive information from those same or other associated customers (not shown). The exemplary optical channels added and dropped at the OADMs 70, 72 are indicated by λ1 and λ2.

Figure 5:
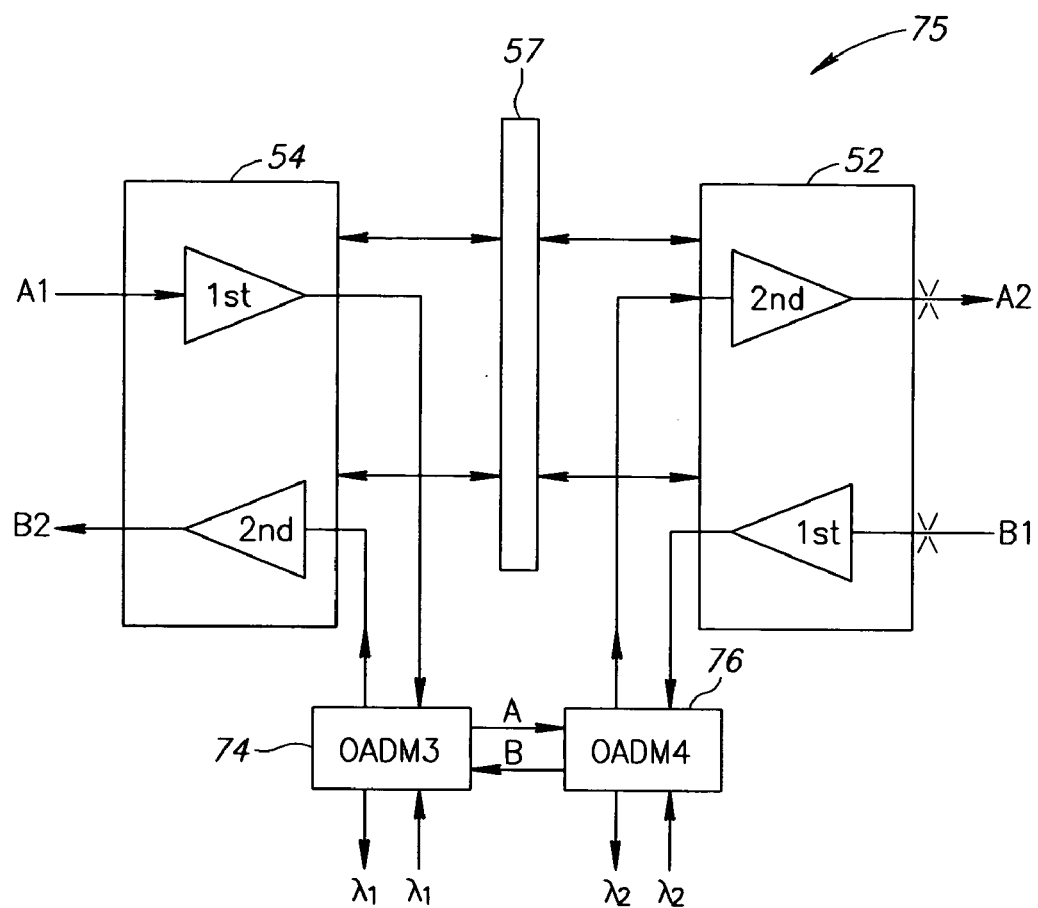
FIG. 5 shows another possible way of inserting two OADMs in the mid-stage of the amplifiers assemblies of the East-West configuration shown in FIG. 3c.

FIG. 5 illustrates another possibility of inserting at least two OADMs in the mid-stage of the East-West configuration schematically shown in FIG. 3c. OADM 3 (marked 74) and OADM4 (marked 76) are connected in the mid-stage of the assemblies 52 and 54. The system shown in FIG. 5 can be considered a network node 75. It should be kept in mind that the node 75 may comprise more optical elements as well as OADMs in the mid-stage. Contrary to the embodiment of FIG. 4, the OADMs 74 and 76 are connected in series, so each direction of the transmission (each optical fiber line) is served by both of the OADMs; or each of the OADMs serves the both two transmission fiber lines. The connections between the OADM3 and OADM4 are intended for conveying through-going optical channels via the transmission lines A (in the direction from A1 to A2) and B (in the direction from B1 to B2). In this configuration, each side of the node 75 is served by a single OADM: namely, the OADM 74 serves the left side of the node, and the OADM 76 serves the right side of the node 75.

Figure 6:
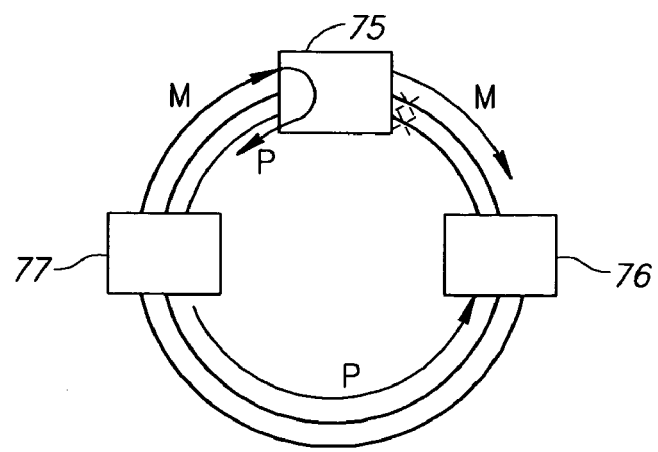
FIG. 6 schematically shows a bi-directional ring-like network with nodes comprising OADMs.

This embodiment is advantageous in ring-like protected networks, where nodes are connected in a ring by bi-directional transmission lines. See, for example, an elementary exemplary ring-like network in FIG. 6, comprising three nodes 75, 77 and 79. In such networks, traffic can normally reach a node from any of two sides of the node. If a main traffic route (M) in one of the directions (77 to 79 via 75) fails due to problems at a particular node (node 75), the traffic is usually looped at that node to use a protective route (P) created in the ring network in the opposite direction, and thus to reach the destination node from the other side (77–75–77–79).

If OADM 4 in FIG. 5 fails or is removed for maintenance, there is no connection between the OADM 4 and OADM 3, the OADM4 and assembly 52. This event blocks all through-going channels from B 1 to B2 and the channels dropped and/or added by the OADM4; in other words, that results in blocking the right side of the node 75. This fact is schematically shown by two dotted crosses at the transmission lines portions A2, B1 in FIG. 5 and also in FIG. 6.

However, as mentioned above, the main route (M) of the traffic from node 77 to node 79 can be looped at node 75 and continued via the protective route (P): node 75-node 77-node 79; thus all nodes in the network remain reachable.

Similarly, failure or removal of OADM3 blocks only the left side of the node 75 and all the network nodes remain reachable.

In contrast, if OADM1 (or OADM2) of FIG. 4 fails in a ring with a bi-directional protection, it will block all optical channels via one of the transmission directions but at both sides of the node 73. Node 73, if being a part of such a ring network, will be isolated from other nodes in the ring.

In view of the above, it can be seen that the embodiment of FIG. 5 is preferable for bi-directional protected networks. Examples of such networks are a bi-directional path switched ring BPSR, a bi-directional line switched ring BLSR, a Multiplex Section Shared Protection Ring MS-SPRING.

However, the embodiment of FIG. 4 suits better for unidirectional protected ring or mesh networks (for example, a unidirectional path switched ring UPSR).

Figure 7:
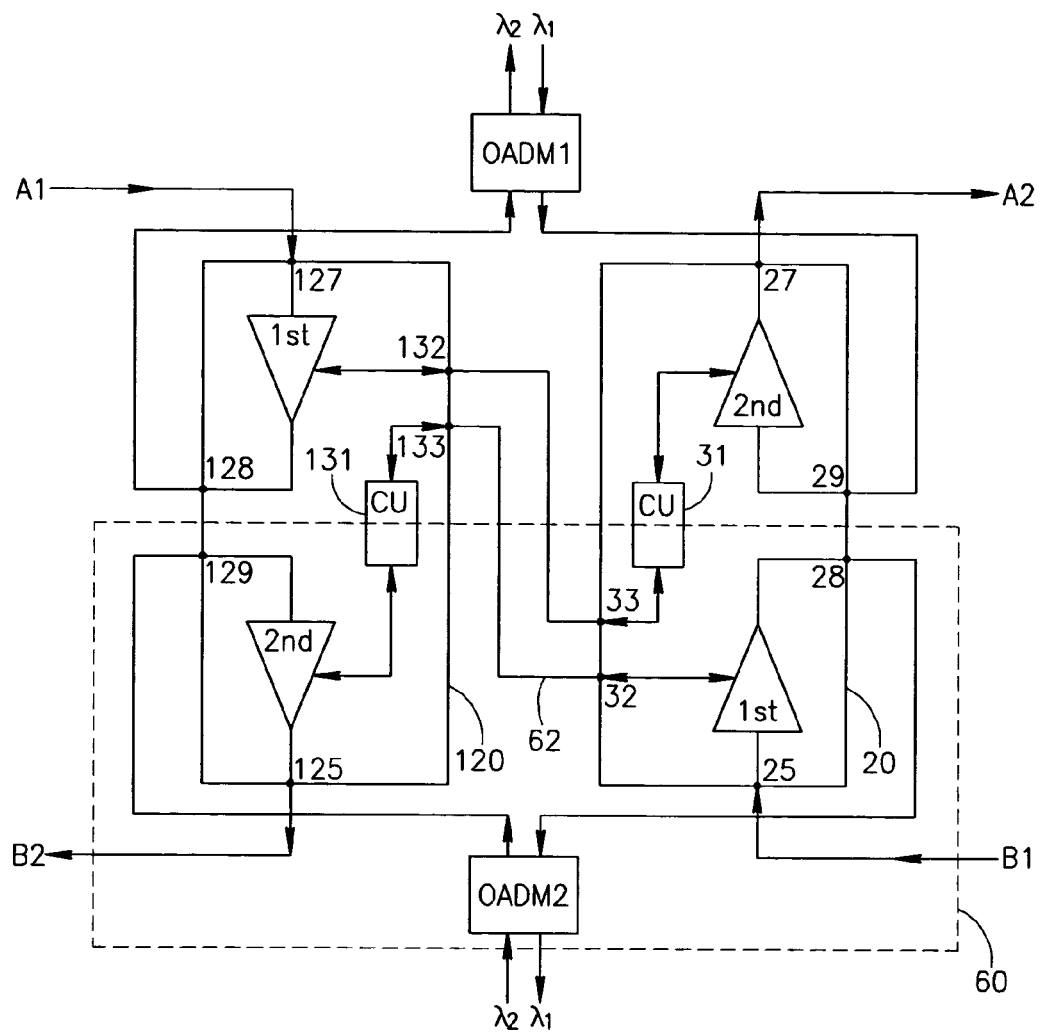
FIG. 7 shows one example of how the East-West configuration of FIG. 4 can be implemented using a pair of the universal assemblies shown in FIG. 2 and a pair of OADMs.

FIG. 7 illustrates an example of how the east-west configuration 50 can be realized using the proposed universal integrated assembly of FIG. 2 and the way of connecting OADMs proposed in FIG. 4. Two integrated assemblies 20 and 120 are shown, and their connections demonstrate how the mid-stages are formed and how new control-communication channels between the newly formed two-stage configurations are formed using portions of the control-communication circuits of the two separate assemblies 20, 120. One of the two newly formed unidirectional configurations is shown by a dotted contour 60, its newly formed control-communication channel is marked 62. The similar configuration, with its control-communication channel, is built for the opposite direction of the optical transmission. OADM1 serves one of the two transmission directions and is switched between the $1^{st}$ and the $2^{nd}$ stage amplifiers serving that direction (A1–A2). OADM2 serves the opposite direction of transmission (B1–B2) and is switched between the $1^{st}$ and $2^{nd}$ stage amplifiers serving that transmission direction. OADM1 and OADM2 are separate and independent. In both cases, the $1^{st}$ and $2^{nd}$ amplifying stages of the two-stage amplifiers belong to different assemblies 120 and 20. Other elements can be included in the mid stage of the configuration, but are not shown in the drawing.

Figure 8:
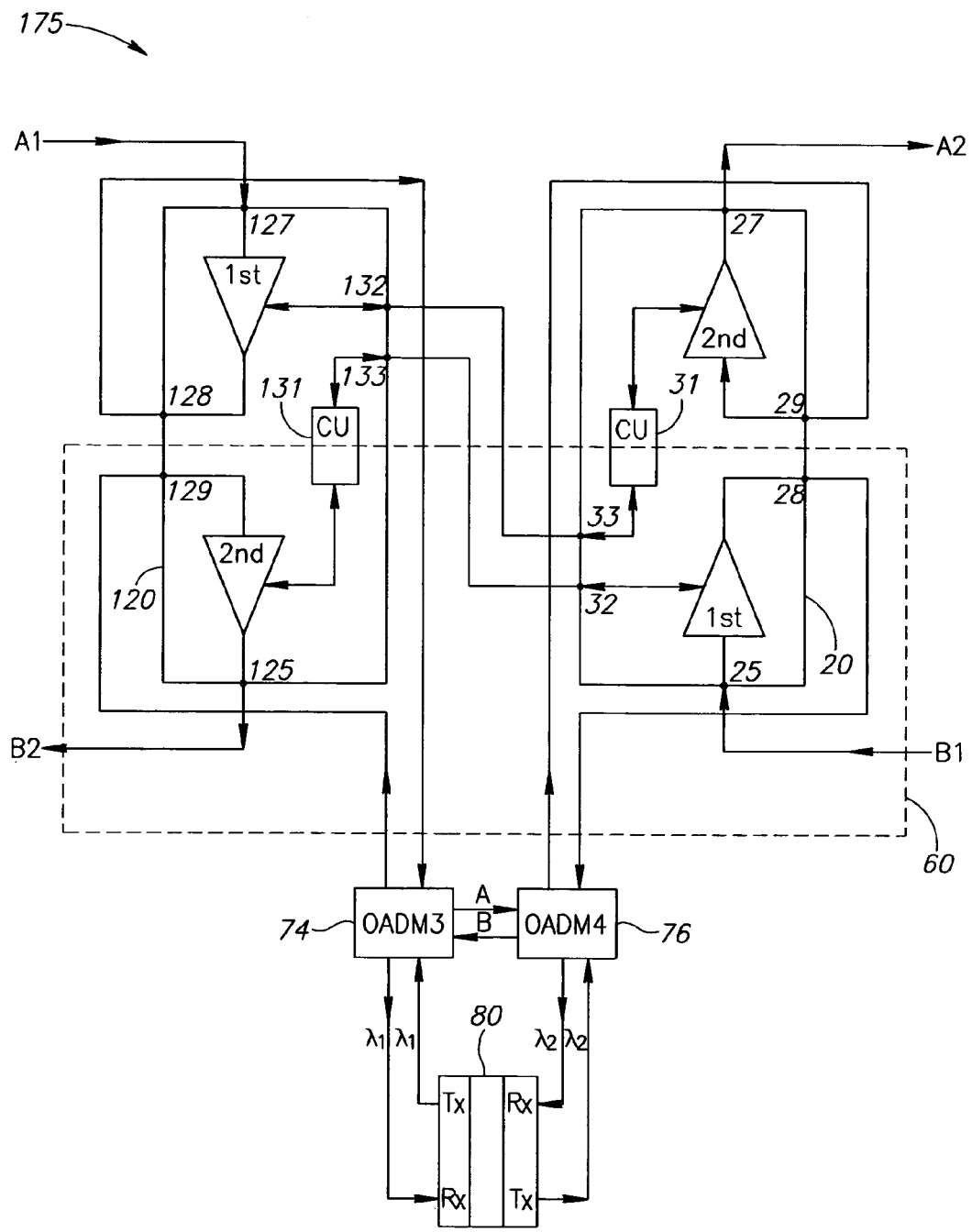
FIG. 8 shows another example of implementing the East-West configuration of FIG. 5, using a pair of amplifier assemblies and a pair of OADMs.

FIG. 8 illustrates implementation of the node 75 of FIG. 7, using the universal assemblies of FIG. 2. The number and combination of the added and dropped channels of the OADMs 74 and 76 are illustrated as an example only, and in practice can be selected as required. Other optical elements may be introduced in the obtained node marked 175. FIG. 8 schematically shows a transmitter/receiver block 80 being part of the node 175, the block 80 is responsible for receiving data from the channels dropped at the node, and transmitting data to channels added at the node. It should be noted that a transmitter/receiver block similar to 80 is preferably intended for SDH/SONET protected topologies; it may be present at any implementation of a node comprising OADM (FIGS. 3B, 3C, 4, 5, 7) and may vary in the number and combination of added/dropped channels, as well as in specific connections of its transmitting and receiving ports to suitable OADMs.

Though the invention has been described with the aid of schematic exemplary embodiments, it should be appreciated that other modifications and more elaborated versions of the described configurations, assembly, system and node might be proposed, which are to be considered part of the invention.

The invention claimed is:

1. A system comprising a pair of two stage amplifiers arranged at two spatially separate modules, for respectively serving two opposite directions of bi-directional optical transmission comprising one or more informational channels each serving exclusively for transmitting optical traffic and not performing supervisory channel functions, wherein
   each of the two-stage optical amplifiers comprises a $1^{st}$ stage, a $2^{nd}$ stage and a mid-stage formed between said two stages, and serves one of the two opposite transmission directions, and wherein
   each stage of said two stages is formed by at least one optical amplifying unit and is located at a spatially separate module, so that each of the two spatially separate modules accommodates the $1^{st}$ stage of one of said amplifiers and the $2^{nd}$ stage of the other of said amplifiers;
   the system comprises at least two Optical Add Drop Multiplexers (OADMs) connected in the mid-stages of said two-stage optical amplifiers and adapted to add and drop said one or more informational channels.

2. The system of claim 1, wherein said OADMs are connected in such a manner that each of the two transmission directions is separately served by one or more of said OADMs by adding/dropping the one or more information channels in said transmission direction.

3. The system of claim 1, wherein said OADMs are connected in such a manner that at least one of the OADMs is switched into both of the two transmission directions and serves both of them, said at least one OADM is switched so as to allow redirecting the optical traffic from one direction to another when required, by interconnecting a $1^{st}$ stage and a $2^{nd}$ stage of the same spatially separate module but of different said two-stage amplifiers.

4. The system according to claim 1, wherein each of said amplifiers
   is provided with a control-communication circuit comprising a control-communication channel arranged between the two stages of the amplifier, for controlling said $1^{st}$ and $2^{nd}$ stages so as to match at least one optical characteristics of one stage to respective at least one characteristics of the other stage among the two stages, and
to prevent automatic shutting down of one of the stages whenever the other of the stages is shut down,
said control-communication circuit further comprising a micro-controller of the two-stage amplifier and connection means for interconnecting said $1^{st}$ and $2^{nd}$ stages of the two-stage amplifier.

5. The system according to claim 4, wherein said two stages are matched to one another in respect and wherein said control-communication channel serves for controlling at least one parameter of the amplifying units of said stages, selected from a list comprising: gain, gain flatness and gain tilt.

6. The system according to claim 5, wherein the optical connection and the control-communication channel between the stages is arranged to externally interconnect said modules.

7. The system according to claim 1, wherein each of said modules is designed as a universal two-stage optical amplifier assembly, comprising said $1^{st}$ stage and a $2^{nd}$ stage being preliminarily matched to one another in respect of at least one optical characteristics,
input of the assembly being connected to input of the $1^{st}$ stage,
output of the $2^{nd}$ stage being connected to output of the assembly, output of the $1^{st}$ stage and input of the $2^{nd}$ stage are respectively connected to a pair of mid-stage contacts of the assembly; said universal assembly being provided with a control-communication circuit adapted to form a control-communication channel between the two stages, and control said two stages so as to match at least one optical characteristics of one stage to respective at least one characteristics of the other stage among the two stages, and to prevent automatic shutting down of one of the stages whenever the other of the stages is shut down;
while said control-communication circuit is also adapted to alternatively form an alternative control-communication channel between any of the stages of said universal assembly and a complementary stage located on another similar universal assembly;
wherein in said system, any of the two OADMs is connected between any of the stages of said universal assembly and a complementary stage of another similar universal assembly, using the mid-stage contacts located at the different universal assemblies, and
said control-communication circuit forms the alternative control-communication channel between at least one of the stages of said universal assembly and a complementary stage located on another similar universal assembly.

8. The system according to claim 7, wherein the $1^{st}$ stage and the $2^{nd}$ stage are preliminarily matched so that the is stage of the universal assembly is preliminarily adjusted to match to a set of characteristics designed for the $2^{nd}$ stage, while the $2^{nd}$ stage of the universal assembly is preliminarily adjusted to match to a set of characteristics designed for the $1^{st}$ stage, thereby any of the 1stage and the $2^{nd}$ stage of said universal assembly approximately matches to a complementary stage of said universal assembly or of another similar universal assembly.

9. The system according to claim 7, wherein the control-communication circuit is capable of dynamically matching any of the $1^{st}$ stage and the $2^{nd}$ stage of said universal assembly to a complementary stage of said universal assembly or of another similar universal assembly.

10. The system according to claim 7, wherein the control-communication circuit is divided into two separate portions respectively suitable for being connected to corresponding separate portions of a control-communication circuit of another similar universal assembly, so as to form a control-communication channel between a $1^{st}$ stage of one assembly and a $2^{nd}$ stage of the other assembly and vice versa.

* * * * *